United States Patent Office 3,068,082
Patented Dec. 11, 1962

3,068,082
RUST INHIBITED HYDROCARBON FUEL
William W. Paris, St. Albans, and Donald Staker, Nitro, W. Va., assignors to Monsanto Chemical Company, St. Louis, Mo., a corporation of Delaware
No Drawing. Original application Aug. 15, 1957, Ser. No. 678,431, now Patent No. 3,004,987, dated Oct. 17, 1961. Divided and this application Aug. 5, 1959, Ser. No. 838,376
9 Claims. (Cl. 44—63)

The present invention relates to new chemical compositions and also to the use of such products in mineral oil compositions adapted to protect ferrous and other metal surfaces with which they come in contact from rusting due to the presence of small quantities of water or water vapor in the mineral oil. Furthermore, the new chemical compounds do not form insoluble salts with alkaline earth salts present in sea water and consequently can be used in mineral oil fractions transported in seagoing oil tankers, where sea water is used as ballast after the tanks have been discharged. Moreover, since lead salts do not form when the new chemicals are used in treating a leaded fuel, the chemicals are adaptable to prevent rusting of metals in motor gasoline, jet fuel and aviation gasoline.

Accordingly, it is an object of the present invention to provide mineral oil compositions which protect metal surfaces with which they come in contact against rusting and corrosion under extreme conditions of service.

A still further object is to provide improved mineral oil compositions containing an effective anti-corrosion additive which does not adversely affect the desirable properties of the oil itself.

The preferred and new compositions comprising the present invention are broadly a reaction product of a diamine and an alkyl or alkenylsuccinic anhydride.

The products are obtained by the reaction of one mole of the diamine with two moles of the anhydride. The products are mixtures although the major component when the diamine is a diprimary amine probably conforms to the general formula

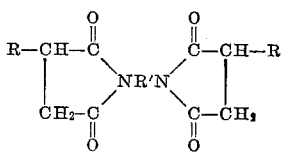

wherein R represents an alkyl or alkenyl radical, preferably containing from 8 to 18 carbon atoms, and R′ represents an alkylene radical. It will be noted that the new products contain two nitrogen atoms, each of which is joined to a succinic acid residue. As typical suitable reactants there are included octenylsuccinic acid anhydride both from normal and branched chain olefins, dodecenylsuccinic acid anhydride, hexadecenylsuccinic acid anhydride and octadecenylsuccinic acid anhydride. As diamines preferred for the reaction described there are included such alkylene diamines as ethylene diamine, hexamethylene diamine, diamino pentane, propylene diamine, trimethylene diamine, diamino hexane, pentamethylene diamine, diamino octane, N-alkyl 1,3-diamino propane wherein the alkyl groups contain 12–18 carbon atoms, and the like.

The method of obtaining the new chemical compositions will be understood from the following examples.

Example 1

Into a reaction vessel equipped with a stirrer, a Dean-Stark trap and temperature indicating means, there were added 41.5 parts (0.25 mole) of hexamethylene diamine as a 70% aqueous solution. Thereupon 62 parts of benzene were added and the mixture was heated to refluxing temperature for about 3 hours. The water was thereby removed to form essentially a water-free benzene solution of the diamine. When this point was reached the mass was cooled to 70° C. and 133.5 parts (0.5 mole) of dodecenylsuccinic anhydride from propylene polymer and maleic anhydride added and the mixture heated to and maintained for 2 hours under very mild reflux. The temperature of the mixture was then increased to 115° C. and held between 115–120° C. for 5 hours during which time 0.33 mole of water was collected. After removing the benzene a viscous amber colored liquid was obtained which was diluted with an equal quantity of kerosene, stirred with 3 parts of clay and filtered. The neutralization number was 17 whereas that calculated for the diamide was 85 and of course 0 for the diimide. The neutralization number calculated for the mixed amide-imide was 45. The product is designated as product A.

Example 2

As a second example of the invention, 133 parts (0.5 mole) of dodecenylsuccinic anhydride as used in Example 1 were placed in a reaction vessel equipped with a stirrer, thermometer and condenser, and 15 parts (0.25 mole) of ethylene diamine added very slowly thereto. When all the diamine had been added, 74 parts of kerosene were added to the mixture and the mass heated at 95–100° C. until the desired neutralization number was obtained for the product. Thereupon the mixture was cooled and an additional 74 parts of kerosene added to obtain a 1:1 solution of the product, tested hereinafter as product B.

Example 3

The amine employed was a mixed primary-secondary diamine of the configuration

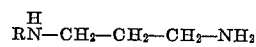

where R represents the long chain alkyl group derived from cocoanut oil. The molecular weight of this intermediate was 321.2. To obtain the new type reaction product therefrom, 133 parts (0.5 mole) of dodecenylsuccinic anhydride as used in Example 1 were added to a reaction vessel as previously described and 80.3 parts (0.25 mole) of the above-identified amine. The mixture was heated for about 4 hours at 92–99° C. and was then cooled, a Dean-Stark trap attached to the equipment and 90 parts of benzene added and refluxing continued for about 3 hours. The resulting product possessed a neutralization number of 71.5 which is substantially theory for the value of an amide-imide having the structure

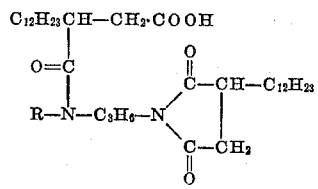

where R is the long chain alkyl group derived from cocoanut oil. This is designated as product C.

Example 4

Following the procedure of Example 3, 133 parts (0.5 mole) of dodecenylsuccinic anhydride as used in Example 1 were charged to a vessel and 100 parts (0.25 mole) of mixed primary-secondary amine, of the configuration

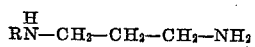

where R represents a long chain alkyl group derived from tallow, added thereto. The molecular weight of this intermediate was 400. After heating for 2 hours, the mass was cooled and 90 parts of benzol added and heated for 4 hours at 100–112° C. Benzol was then removed by distillation, under 30 mm. mercury at 120° C. The product obtained, designated as product D, possesses the probable structure $$\begin{array}{c} C_{12}H_{23}CH-CH_2\cdot COOH \\ O=C \\ \phantom{O=}\backslash \phantom{xxx} O \\ \phantom{xxxxxxx} \| \\ \phantom{xxxxxxx} C-CH-C_{12}H_{23} \\ R-N-C_3H_6-N \\ \phantom{xxxxxxxxxxx} \backslash C-CH_2 \\ \phantom{xxxxxxxxxxxxx} \| \\ \phantom{xxxxxxxxxxxxx} O \end{array}$$

where R represents the higher alkyl group derived from tallow.

*Example 5*

In a like manner, as described in Example 1, dodecenylsuccinic anhydride products of other diamines such as tetramethylene diamine, 1,3-diamino propane and 1,3-diamino butane are obtainable. For use in mineral oil compositions it is desirable that all such products be soluble at least to the extent of 1% by weight in petroleum ether, which quantity far exceeds the amount of the materials required for use as rust inhibitors in petroleum fractions. Thus, operating as previously described, 22 parts (0.25 mole) of 1,3-diamino butane and 133 parts (0.5 mole) of dodecenylsuccinic anhydride as used in Example 1 were added to a vessel equipped with a stirrer, a Dean-Stark trap and temperature indicating means and heated, with stirring, at 95–100° C. for about 35 hours or until the approximate neutralization number was obtained. The product was sufficiently soluble in petroleum ether and was collected as a 1:1 solution in kerosene.

In order to determine the application of the new products as adjuvants in petroleum oil fractions, various reaction products of the class described were tested in a plurality of methods as described below.

*Solubility and rust test.*—The solubility in a petroleum oil was determined by adding 1% by weight of the chemical product to 100 parts of petroleum ether and stirring. If any residue be observed, the product is indicated as insoluble. The rust preventive properties of the chemical products were observed by carefully cleaning and polishing in the well recognized manner for performing this test strips of steel 3½" x ⅝" x 1/16" having an S.A.E. grade designation 1020 and vigorously shaking the specimen in 75 cc. of petroleum ether containing the desired concentration or concentrations (from 5 to 40 parts per million of solvent) of the rust inhibitor. After standing for about one-half hour, 2 cc. of distilled water are added and the sample is reshaken. The strip is allowed to stand in the wet petroleum ether at room temperature for about 3 hours, is then removed and is visually inspected for rust. To pass this test there shall not be more than 5 pinpoint dots of rust over the entire metal surface.

*Water tolerance test, A.S.T.M. D1094–53.*—This test is used to evaluate the emulsion characteristics of the rust inhibited petroleum fraction, such as a petroleum fuel. The apparatus consists of a 100 cc. glass stoppered graduated cylinder, which after thorough cleaning is rinsed thoroughly with distilled water and stored completely full of distilled water until used in a test. The water is removed and 80 cc. of iso-octane containing 20 parts per million of the inhibitor under test is placed in the graduate and 20 cc. of distilled water added thereto and the mixture is shaken vigorously at room temperature for 2 minutes. The mixture is then allowed to stand on a vibration-free surface for 5 minutes whereupon the volume of the aqueous layer and the amount of emulsion, if any, are recorded. In order to pass the test, the fuel shall separate sharply from the water and there shall be no evidence of an emulsion, precipitate or suspended matter within or upon either layer. Neither layer shall have changed more than 1 cc. in volume.

*Sea water reaction test.*—This test is designed to determine the solubility of the alkaline earth salts of rust inhibitors. Synthetic sea water was prepared according to the method set forth in procedure B, A.S.T.M. D665–53T. The method consists in adding 250 cc. of n-heptane containing about 200 p.p.m. of the material to be tested and 25 cc. of synthetic sea water to a 500 cc. 3-neck flask equipped with stirrer and reflux condenser and stirring for 30 minutes at room temperature. Agitation was stopped and when motion had ceased the interface was examined for scum and the walls of the flask examined for precipitate of which there shall be none.

*Lead salt test.*—This test is designed to indicate the possibility of precipitate from the use of rust inhibitor in a leaded gasoline. In this test, an ionizable lead salt is added to assure the presence of lead ion. The test solution is prepared by dissolving 25 parts of lead naphthenate in 2500 parts of a regular gasoline and the solution is filtered through a double thickness of filter paper and then through a layer of fuller's earth. Thereupon 100 cc. of the test solution is added to a 500 cc. 3-neck flask equipped with a stirrer and air condenser. Agitation is started and the rust inhibitor under test is added dropwise until about 0.5 gram has been added whereupon agitation is continued for an hour at room temperature and the mixture is examined for haziness or insolubles with the aid of a flashlight. To pass the test there shall be no more haze than is exhibited by use of a blank test with no inhibitor present.

Results obtained from selected tests of those described above with various products within the present invention were as follows:

Products indicated as A, C and D were all soluble in mineral oil and passed the emulsion, rust, sea water and lead salt tests. Product B was also soluble as required and passed the water tolerance, rust and sea water tests.

It is intended to cover all changes and modifications of the invention herein chosen for purposes of disclosure which do not constitute departures from the spirit and scope of the invention.

This application is a division of application Serial No. 678,431, filed August 15, 1957, and now U.S. Patent 3,004,987.

What is claimed is:

1. A liquid mineral hydrocarbon fuel containing dissolved therein a small amount sufficient to inhibit rusting of ferrous metal surfaces of a reaction product obtained by heating at 92–120° C. substantially two molar proportions of an anhydride selected from the group consisting of alkenyl succinic anhydride containing from 8 to 18 carbon atoms in the alkenyl group and alkyl succinic anhydride containing from 8 to 18 carbon atoms in the alkyl group and substantially one molar proportion of an alkylene diamine containing from 2 to 6 carbon atoms in the alkylene group, each amino group thereof containing at least one hydrogen, at least one of said amino groups being primary and removing by-product water.

2. The fuel composition as defined in claim 1 wherein the anhydride is dodecenyl succinic anhydride.

3. Gasoline containing dissolved therein a small amount sufficient to inhibit rusting of ferrous metal surfaces of a reaction product obtained by heating at 92–120° C. substantially two molar proportions of an anhydride selected from the group consisting of alkenyl succinic anhydride containing from 8 to 18 carbon atoms in the alkenyl group and alkyl succinic anhydride containing from 8 to 18 carbon atoms in the alkyl group and substantially one molar proportion of an alkylene diamine containing from 2 to 6 carbon atoms in the alkylene group, each amino group thereof containing at least one hydrogen, at least one of said amino groups being primary and removing by-product water.

4. Gasoline containing dissolved therein a small amount sufficient to inhibit rusting of ferrous metal surfaces of a reaction product obtained by heating at 92–120° C. substantially two molar proportions of dodecenyl succinic anhydride and substantially one molar proportion of an alkylene di(primary amine) containing from 2 to 6 carbon atoms in the alkylene group and removing by-product water.

5. The fuel composition as defined in claim 4 wherein the alkylene di-(primary amine) is hexamethylene diamine.

6. The fuel composition as defined in claim 4 wherein the alkylene di(primary amine) is ethylene diamine.

7. Leaded gasoline containing dissolved therein a small amount sufficient to inhibit rusting of ferrous metal surfaces of a reaction product obtained by heating at 92–120° C. substantially two molar proportions of an anhydride selected from the group consisting of alkenyl succinic anhydride containing from 8 to 18 carbon atoms in the alkenyl group and alkyl succinic anhydride containing from 8 to 18 carbon atoms in the alkyl group and substantially one molar proportion of an alkylene diamine containing from 2 to 6 carbon atoms in the alkylene group, each amino group thereof containing at least one hydrogen, at least one of said amino groups being primary and removing by-product water.

8. Gasoline containing dissolved therein a small amount sufficient to inhibit rusting of ferrous metal surfaces of a product having the structure

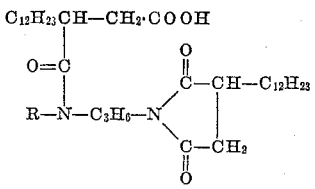

where R is the long chain alkyl group derived from cocoanut oil.

9. Gasoline containing dissolved therein a small amount sufficient to inhibit rusting of ferrous metal surfaces of a product having the structure

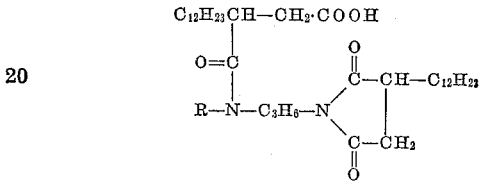

where R represents the higher alkyl group derived from tallow.

References Cited in the file of this patent

UNITED STATES PATENTS

| | | |
|---|---|---|
| 2,540,800 | Trigg et al. | Feb. 6, 1951 |
| 2,598,213 | Blair | May 27, 1952 |
| 2,604,451 | Rocchini | July 22, 1952 |
| 2,750,339 | Steinhauff | June 12, 1956 |